Jan. 27, 1970  C. MICHELSON  3,492,066
KINEMATOGRAPHIC PROJECTORS
Filed July 14, 1966
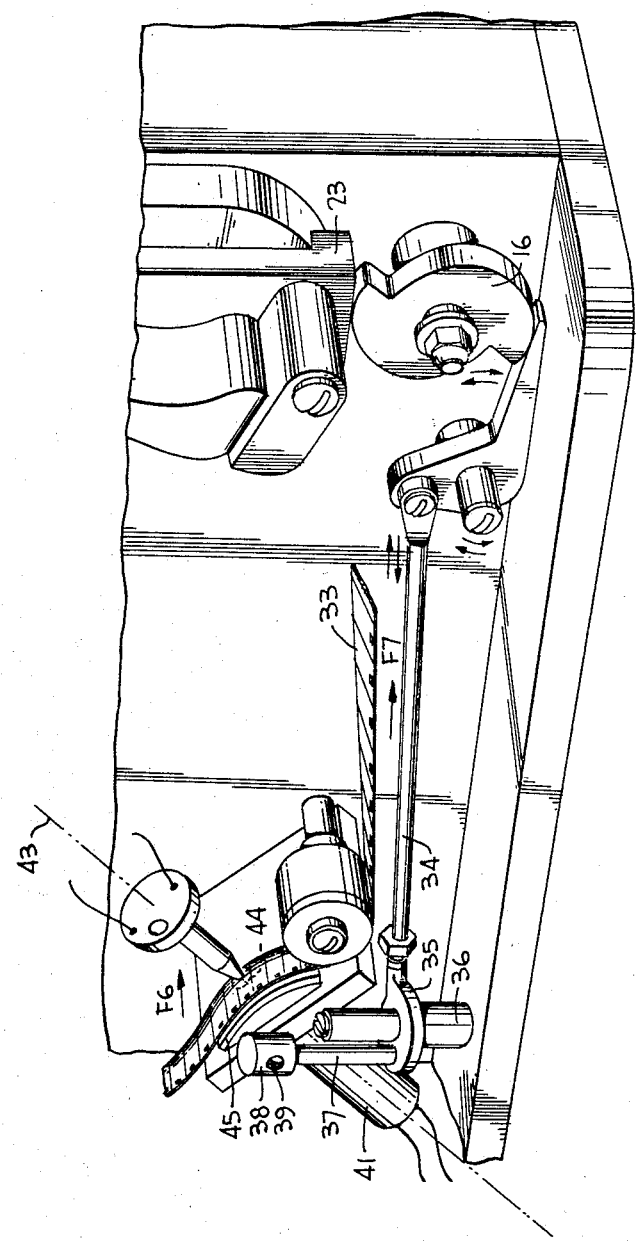
INVENTOR,
CHARLES MICHELSON
BY Watson, Cole, Grindle & Watson
ATTORNEYS

United States Patent Office 3,492,066
Patented Jan. 27, 1970

3,492,066
KINEMATOGRAPHIC PROJECTORS
Charles Michelson, Paris, France, assigner to Teverama S.A., Lausanne, Vaud, Switzerland, a company of Switzerland
Filed July 14, 1966, Ser. No. 565,280
Claims priority, application France, July 15, 1965, 24,719
Int. Cl. G03b *31/00, 41/00*
U.S. Cl. 352—10
3 Claims

ABSTRACT OF THE DISCLOSURE

A motion picture projector has an image projection optical system adjustably mounted for shifting between different sequences of interdigitated images on a film. An optical sound pick-up system is adjustably mounted for shifting between juxtaposed sound tracks. The sound pick-up system comprises a source of light and a photocell mounted on a support which may be moved transversely of the film. The sound pick-up system and the image projection optical system are connected such that when the image projection optical system is shifted so as to project a different sequence of images the sound pick-up is shifted to the appropriate sound track.

---

The present invention relates to kinematographic projector intended particularly for use with endless sound films of the type carrying on the one hand kinematographic pictures belonging to different sequences and distributed in alternation, the pictures of one sequence which are to be projected in succession not being adjacent and being separated by intervals carrying one or more pictures belonging to one or more other sequences, and on the other hand juxtaposed sound tracks corresponding respectively to said picture sequences and wherein the recorded sound signals corresponding to any one picture occupy a length of film equal to that of a picture pitch i.e. to the spacing between two successive pictures of a same sequence. Such an endless sound film carrying multiple sequences is described in the U.S. patent application Ser. No. 475,204, now abandoned.

The working of such a film in a projector implies a switching between the sound tracks for each cyclic operation of the film together with a control such that said switchings are obtained at the point where the beginning of the film is glued or welded to the end of the latter. The moment at which said switching is to be performed is defined materially on the film by a notch, a perforation, a metallized section or any other suitable local modification of the film adapted to produce directly or otherwise such a switching.

The present invention covers more specifically an improvement to the projector described in my co-pending U.S. application Ser. No. 504,483.

According to said improvement, the sound reading means of the projector include a source of light supplying a concentrated illumination of a section of the sound track extending breadthwise of the latter and associated with a photocell ensuring a centered detection limited to the section thus illuminated, said source of light and said photocell being carried by a support adapted to move translationally in a direction transverse of the direction of progression of the film so as to ensure respectively the local illumination and the localized detection of the actual breadth of the single illuminated sound track The single figure of the accompanying drawing is a perspective view illustrating the operation-controlling cam, the transmissions associated therewith and the sound-reading means.

The arrangement illustrated includes a cam 16 acting simultaneously on the one hand on the means controlling the shifting of the pictures through the agency, for instance, of a slider 23 and on the other hand on the means controlling the change of soung track. Said latter control is performed through the agency of a linkage 34 leading to a small plate 35 revolvably carried by a stationary pivot 36 and carrying an eccentric projection 37 parallel with said pivot and capped by an eccentric ring or annulus 38 the relative angular position of which with reference to the pivot is defined by the screwing of a screw 39.

Said annulus engages a support 40 adapted to move in a direction F6 perpendicular to the direction of progression of the film 33, against an antagonistic return force when the linkage 34 moves in the direction F7 under the action of the cam 16. The eccentricity of the annulus 38 allows, upon release of the screw 39, adjusting the starting point of the movement of the transversely sliding support 40.

Said support 40 carries, on the one hand, a source of light 41 producing an illumination concentrated onto a thin line the length of which is equal to the breadth of a sound track and it carries furthermore on the other hand a photocell 42 adapted to provide a localized detection of the luminous line produced by the source 41.

The source 41 and the cell 42 are obviously arranged coaxially along the same axis 43 extending through an opening 44 formed in a stationary guide 45 over which the film 33 passes, said opening registering with the optic sound track of said film.

It is apparent that the control produced by the cam 16 results in a shifting in a transverse direction F6 of the support 40 and consequently of the system including the source of light 41 and the cell 42, the kinematic transmission being defined in a manner such that e.g. a rotation of the cam 16 by one eighth of a revolution produces a shifting of the unit 40, 41, 42, by a distance equal to the spacing between two successive sound tracks. Obviously, with such an arrangement the illumination and detection are obtained for all the sound tracks under perfectly similar conditions.

What I claim is:

1. A sound movie projector for films of the kind having interdigitated motion picture frames belonging to different film sequences and juxtaposed optical sound tracks corresponding respectively to said film sequences, said projector being of the kind comprising a frame projecting optical system adjustably related to said film to undergo relative shift with respect thereto for film sequence switching purpose, and a sound pick-up optical system which is focusable on one exclusive sound track and which includes a source of light and photoelectric cell assembly, wherein the improvement comprises a support movable transversely with respect to the direction of motion of the film in the projector and carrying said source of light and photoelectric cell assembly, means for adjustably positioning said transversely movable support whereby said sound pick-up optical system is focused on a selected sound track, and control means for synchronously adjusting said frame projecting system and said support positioning means.

2. A projector as claimed in claim 1, further comprising a stationary film-guiding channel fitted in the region of said sound pick-up optical system and provided with an opening positioned and sized to override said juxtaposed optical sound tracks on the film, said source of light and photoelectric cell assembly having an optical axis which registers with said opening in every adjusted position of said transversely movable support.

3. A projector as claimed in claim 1, wherein said control means comprise actuator cam means, and mechanical linkage means under the control of said cam and extending therefrom to both said frame projecting system and said support positioning means.

References Cited

UNITED STATES PATENTS

| | | | |
|---|---|---|---|
| 1,963,079 | 6/1934 | Duke | 352—37 |
| 2,029,979 | 2/1936 | Bernheim | 352—37 |
| 2,215,502 | 9/1940 | Harper | 352—37 |
| 2,322,369 | 6/1943 | Lackoff et al. | 352—10 |
| 3,284,923 | 11/1966 | Leslie | 352—82 |
| 3,341,276 | 9/1967 | Prater | 352—37 |

OTHER REFERENCES

A. P. C. application of Lamarchia, Ser. No. 386,195, published May 4, 1943.

NORTON ANSHER, Primary Examiner

M. H. HAYES, Assistant Examiner

U.S. Cl. X.R.

352—37, 82